United States Patent
Takahashi et al.

(10) Patent No.: US 7,669,685 B2
(45) Date of Patent: Mar. 2, 2010

(54) PEDESTRIAN PROTECTING APPARATUS FOR VEHICLE

(75) Inventors: Hisashi Takahashi, Kariya (JP); Shigenori Kobayashi, Hazu-gun (JP)

(73) Assignee: DENSO Corporation, Kariya (JP)

( * ) Notice: Subject to any disclaimer, the term of this patent is extended or adjusted under 35 U.S.C. 154(b) by 786 days.

(21) Appl. No.: 11/501,593

(22) Filed: Aug. 9, 2006

(65) Prior Publication Data
US 2009/0050394 A1 Feb. 26, 2009

(30) Foreign Application Priority Data
Aug. 16, 2005 (JP) .............................. 2005-235989

(51) Int. Cl.
*B60R 21/00* (2006.01)
*B60R 21/34* (2006.01)

(52) U.S. Cl. .................. 180/271; 180/274; 280/762; 701/45

(58) Field of Classification Search ................ 180/271, 180/274; 701/45; 280/762
See application file for complete search history.

(56) References Cited

U.S. PATENT DOCUMENTS

| 7,353,087 | B2 | 4/2008 | Takafuji et al. | |
|---|---|---|---|---|
| 2004/0182629 | A1* | 9/2004 | Takahashi et al. | 180/274 |
| 2004/0186643 | A1* | 9/2004 | Tanaka et al. | 701/45 |
| 2005/0021192 | A1 | 1/2005 | Takafuji et al. | |
| 2005/0096815 | A1* | 5/2005 | Takafuji et al. | 701/45 |
| 2005/0096816 | A1* | 5/2005 | Takafuji et al. | 701/45 |
| 2005/0154530 | A1 | 7/2005 | Hosokawa et al. | |
| 2006/0162982 | A1* | 7/2006 | Lich | 180/271 |
| 2006/0185922 | A1* | 8/2006 | Tanabe | 180/274 |
| 2006/0212201 | A1* | 9/2006 | Takahashi et al. | 701/45 |
| 2006/0213714 | A1* | 9/2006 | Igawa | 180/274 |
| 2006/0231321 | A1* | 10/2006 | Takahashi | 180/274 |
| 2007/0039772 | A1* | 2/2007 | Stuve | 180/274 |
| 2007/0068721 | A1* | 3/2007 | Browne et al. | 180/274 |
| 2007/0102219 | A1* | 5/2007 | Park | 180/274 |
| 2007/0125589 | A1* | 6/2007 | Murphy | 180/274 |
| 2007/0237027 | A1* | 10/2007 | Sugiura et al. | 367/96 |

FOREIGN PATENT DOCUMENTS

DE 103 36 638 2/2005

(Continued)

OTHER PUBLICATIONS

Office action dated Apr. 5, 2007 in German Application No. 10 2006 038 003.7 with English translation.

(Continued)

*Primary Examiner*—Paul N. Dickson
*Assistant Examiner*—Barry Gooden, Jr.
(74) *Attorney, Agent, or Firm*—Harness, Dickey & Pierce, PLC (57) ABSTRACT

A pedestrian protecting apparatus is provided with a pedestrian protecting unit which is mounted at a hood of a vehicle to protect a pedestrian in a collision with the vehicle, a detecting unit for measuring an inclination angle of the obstacle entering a predetermined region at an upper side of the hood, a pedestrian collision determining unit for determining the collision between the vehicle and the pedestrian based on the measured inclination angle of the obstacle, and a control unit. In the case where the measured inclination angle of the obstacle varies with the time elapse so that the obstacle inclines to the side of the hood, the pedestrian collision determining unit determines that there occurs the collision between the vehicle and the pedestrian. Thus, the control unit actuates the pedestrian protecting unit.

15 Claims, 9 Drawing Sheets

FOREIGN PATENT DOCUMENTS

| | | |
|---|---|---|
| DE | 103 46 622 | 5/2005 |
| JP | 08-216826 | 8/1996 |
| JP | 2003-104143 | 4/2003 |
| JP | 2003-226211 | 8/2003 |
| JP | 2003-302470 | 10/2003 |
| JP | 2005-053473 | 3/2005 |
| WO | WO 2004/089704 | 10/2004 |
| WO | WO 2005/051726 | 6/2005 |

OTHER PUBLICATIONS

Office action dated Nov. 26, 2009 in corresponding Japanese Application No. 2005-235989.

* cited by examiner

PEDESTRIAN PROTECTING APPARATUS FOR VEHICLE

CROSS REFERENCE TO RELATED APPLICATION

This application is based on a Japanese Patent Application No. 2005-235989 filed on Aug. 16, 2005, the disclosure of which is incorporated herein by reference.

FIELD OF THE INVENTION

The present invention relates to a pedestrian protecting apparatus for a vehicle, which protects a pedestrian in a collision between the vehicle and the pedestrian.

BACKGROUND OF THE INVENTION

Generally, a pedestrian protecting apparatus for a vehicle is provided with a collision sensor arranged at the front portion of the vehicle, and a position determination sensor arranged in a passenger compartment of the vehicle, for example, referring to JP-2003-104143A. In this case, an obstacle colliding with the vehicle is determined to be a pedestrian, when the collision between the vehicle and the obstacle is detected by the collision sensor and the intrusion of the obstacle into a predetermined region on the hood is thereafter detected by the position determination sensor. Then, an airbag is deployed on the hood of the vehicle.

However, the obstacle other than the pedestrian can also intrude into the predetermined region on the hood. For example, in the case where the vehicle collides with a two-stage-stacked object such as a wooden box and a corrugated cardboard box, the upper-stage member of the wooden box or the like will enter the predetermined region on the hood to be determined as the pedestrian. Thus, the unnecessary actuation of the airbag will be caused.

SUMMARY OF THE INVENTION

In view of the above-described disadvantages, it is an object of the present invention to provide a pedestrian protecting apparatus for a vehicle, which can detect a collision between the vehicle and a pedestrian with an improved accuracy.

The pedestrian protecting apparatus for the vehicle is provided with a pedestrian protecting unit which is mounted at a hood of the vehicle to protect a pedestrian in a collision between the vehicle and the pedestrian, a detecting unit which senses an obstacle entering a predetermined region at an upper side of the hood and measures a recognition parameter of the obstacle, a pedestrian collision determining unit for determining whether or not there occurs the collision between the vehicle and the pedestrian based on the measured recognition parameter of the obstacle, and a control unit which actuates the pedestrian protecting unit in the case where the collision between the vehicle and the pedestrian is determined by the pedestrian collision determining unit.

That is, the detecting unit not only senses the intrusion of the obstacle into the predetermined region at the upper side of the hood, but also measures the recognition parameter for sort-distinguishing the obstacle. It is determined that the collision is between the vehicle and the pedestrian, in the case where the obstacle entering the predetermine region has been detected and the measured recognition parameter of the obstacle is within a predetermined range. Therefore, the collision between the vehicle and the pedestrian can be determined with an improved accuracy.

Preferably, the recognition parameter of the obstacle is a variation of an inclination angle of the obstacle with respect to a vehicle traveling direction. The detecting unit is an inclination angle variation detecting unit which senses the obstacle entering the predetermined region and measures the variation of the inclination angle of the obstacle. The pedestrian collision determining unit determines whether or not there occurs the collision between the vehicle and the pedestrian based on the variation of the inclination angle variation measured by the inclination angle variation detecting unit.

That is, the pedestrian collision determining unit determines that the obstacle is the pedestrian, in the case where the obstacle having entered the predetermined region at the upper side of the hood gradually inclines to the hood.

In the case where there occurs the collision between the vehicle and the pedestrian, the pedestrian will intrude to the upper side of the hood and fall onto the hood gradually. That is, in the case of the collision between the vehicle and the pedestrian, the inclination angle of the pedestrian varies gradually with the time elapse. Accordingly, the pedestrian protecting apparatus can substantially actuate the pedestrian protecting unit in the case of the collision between the vehicle and the pedestrian.

On the other hand, in the case where the vehicle collides with a two-stage stacked object such as a wooden box or a corrugated cardboard, the upper-stage member of the wooden box or the like will move to slide along the lower-stage member thereof. In this case, even when the upper-stage member of the wooden box or the like enters the predetermined region at the upper side of the hood, the inclination angle of the upper-stage member thereof does not change. Thus, the collision between the vehicle and the pedestrian can be substantially distinguished from that between the vehicle and the two-stage stacked wooden box or the like. Thus, an unnecessary actuation of the pedestrian protecting unit can be restricted.

The pedestrian protecting unit can be constructed of a device for lifting the hood, or an airbag device for deploying an airbag on the hood, or the like.

More preferably, the inclination angle variation detecting unit measures the variation of the inclination angle of a surface of the obstacle. The pedestrian collision determining unit determines whether or not there occurs the collision between the vehicle and the pedestrian, based on the variation of the inclination angle of the surface of the obstacle.

Thus, the inclination angle variation of the obstacle having intruded to the upper side of the hood can be detected. In this case, the collision between the vehicle and the pedestrian can be determined by a detection of the inclination angle variation of a vehicle-rear-side part of the surface of the obstacle, for example. Alternatively, the inclination angle variation of the obstacle can be also detected by using the external shape of the obstacle, instead of the surface of the obstacle.

More preferably, the pedestrian collision determining unit determines that there occurs the collision between the vehicle and the pedestrian, in the case where the inclination angle of the obstacle with respect to the vehicle traveling direction becomes small with the time elapse.

For example, in the case where there occurs the collision between the vehicle and the obstacle having a much higher rigidity than a human body, the obstacle scarcely falls onto the hood. Thus, the inclination angle of the obstacle does not change with the time elapse. However, in the case of the collision between the vehicle and the pedestrian, the pedestrian falls onto the hood to incline to the side of the hood.

Accordingly, in the case where it is detected that the inclination angle of the obstacle becomes small (that is, obstacle inclines toward the hood) with the time elapse, the collision between the vehicle and the pedestrian can be determined. Thus, the detection accuracy of the collision with the pedestrian can be improved.

BRIEF DESCRIPTION OF THE DRAWINGS

Other obstacles, features and advantages of the present invention will become more apparent from the following detailed description made with reference to the accompanying drawings, in which.

DETAILED DESCRIPTION OF THE EXAMPLE EMBODIMENTS

First Embodiment

A pedestrian protecting apparatus for a vehicle 1 according to a first embodiment of the present invention will be described with reference to FIGS. 1-10. The pedestrian protecting apparatus is provided with a sensing member 3 (e.g., milliwave radar), a calculating unit 11 (e.g., inclination angle calculating unit), a pedestrian collision determining unit 12, a control unit 13 and a pedestrian protecting unit 14, referring to FIG. 5.

Figure 1A:
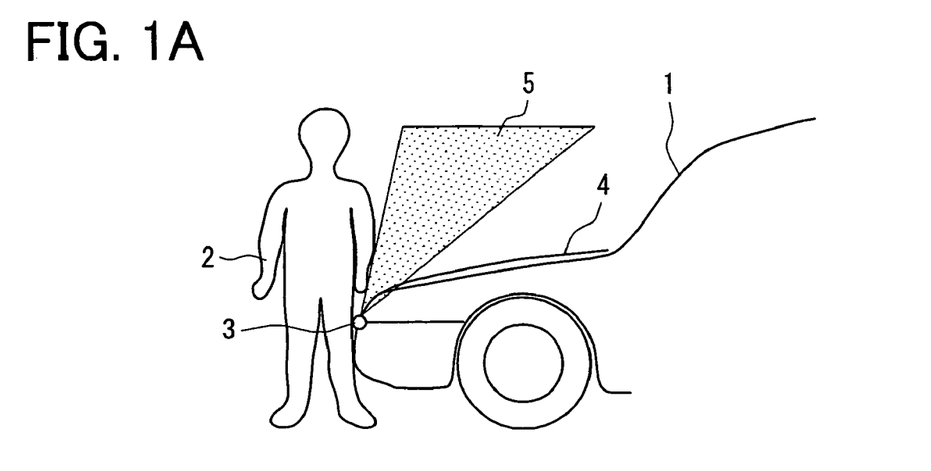
FIG. 1A is a schematic view showing a vehicle and a pedestrian at an instant when a collision between the vehicle and the pedestrian begins according to a first embodiment of the present invention.
Figure 1B:
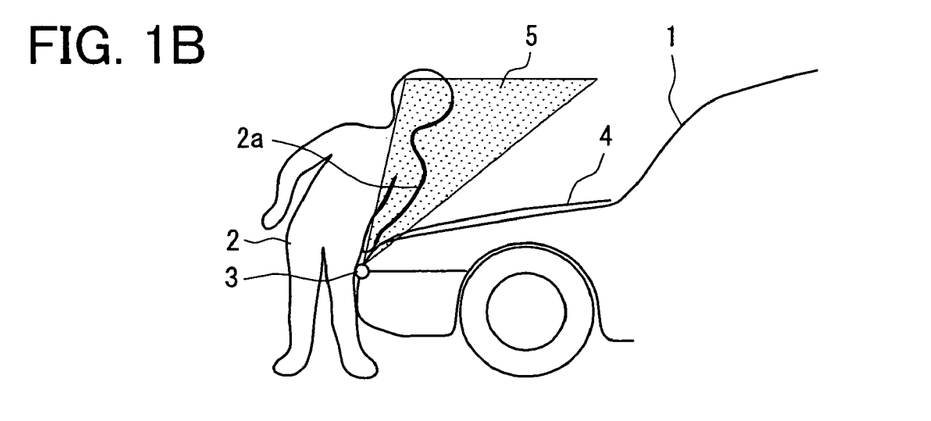
FIG. 1B is a schematic view showing the vehicle and the pedestrian when the time has slightly elapsed from the state shown in FIG. 1A.
Figure 1C:
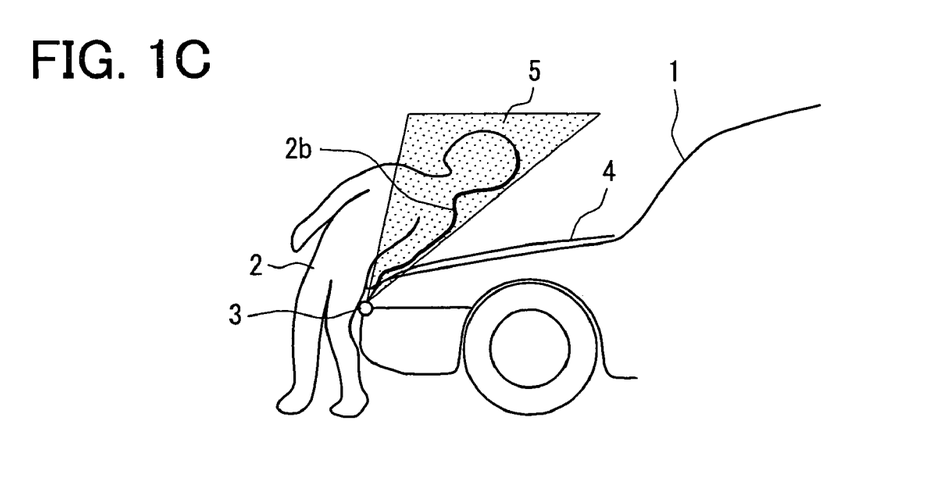
FIG. 1C is a schematic view showing the vehicle and the pedestrian when the time has slightly elapsed from the state shown in FIG. 1B.

As shown in FIGS. 1A-1C, the milliwave radar 3 can be arranged at an upper portion of a grill of a front portion of the vehicle 1. The milliwave radar 3 senses the surface of an obstacle (object) existing within a predetermined sensing region 5 which is set at an upper side of a hood 4 of the vehicle 1, by scanning the sensing region 5. That is, the milliwave radar 3 can detect the surface of the obstacle such as a human 2 (e.g., pedestrian) in the case where the obstacle intrudes into the sensing region 5.

FIGS. 1A-1C show a collision between the vehicle 1 and the pedestrian 2. At the instant when the collision between the vehicle 1 and the pedestrian 2 begins, the pedestrian 2 stands ahead of the vehicle 1 as shown in FIG. 1A. That is, the pedestrian 2 is not positioned in the sensing region 5 of the milliwave radar 3.

Subsequently, when the time has slightly elapsed from the state shown in FIG. 1A, the upper portion (which is at upper side of contact position between pedestrian 2 and vehicle 1) of the pedestrian 2 falls toward the hood 4 of the vehicle 1 as shown in FIG. 1B. That is, the upper portion of the pedestrian 2 partially enters the sensing region 5 of the milliwave radar 3. Specifically, the vehicle-rear-side part of the upper portion of the pedestrian 2 enters the sensing region 5 of the milliwave radar 3. Referring to FIG. 1B, the part of the vehicle-rear-side surface of the pedestrian upper portion which intrudes into the sensing region 5 is indicated by the reference sign 2a.

When the time has further slightly elapsed from the state shown in FIG. 1B, the upper portion of the pedestrian 2 falls further backward to the side of the hood 4 as shown in FIG. 1C. That is, the upper portion (including surface of vehicle-rear-side part of upper portion) of the pedestrian 2 inclines to the side of the hood 4, as compared with the state of FIG. 1B. Especially, the higher part of the surface of the pedestrian 2 inclines more greatly to the side of the hood 4 as compared with the state of FIG. 1B. Referring to FIG. 1C, the part of the vehicle-rear-side surface of the pedestrian upper portion which intrudes into the sensing region 5 of the milliwave radar 3 is indicated by the reference sign 2b.

Figure 2:
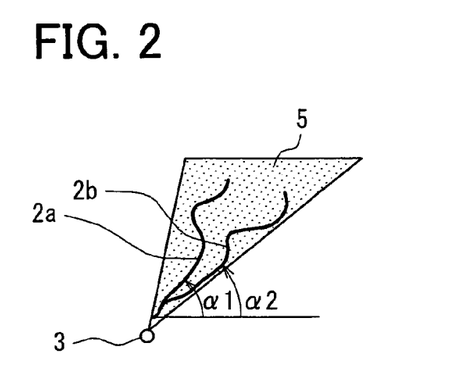
FIG. 2 is a graph showing a temporal-progress state of a surface of an upper portion of the pedestrian in a sensing region of a milliwave radar according to the first embodiment.

FIG. 2 shows a temporal-progress state of the part of the vehicle-rear-side surface of the pedestrian upper portion in the sensing region 5. That is, with the time elapsing, the part (which enters sensing region 5) of the vehicle-rear-side surface of the pedestrian upper portion varies from the surface 2a (referring to FIG. 1B) to the surface 2b (referring to FIG. 1C).

The surface 2a and the surface 2b respectively have an inclination angle α1 and an inclination angle α2 with respect to the ground (i.e., with respect to vehicle traveling direction). α2 is smaller than α1.

According to the pedestrian protecting apparatus in this embodiment, it is determined that the obstacle colliding with the vehicle 1 is the pedestrian 2 in the case where the inclination angle α of the obstacle intruding into the sensing region 5 of the milliwave radar 3 becomes small with the time elapsing. The inclination angle α of the obstacle can be set as an angle between the part (in sensing region 5) of the vehicle-rear-side surface of the obstacle and the vehicle traveling direction, for example. In this case, the inclination angle α of the obstacle is measured to be used as a recognition parameter for sort-distinguishing the obstacle.

That is, in the case where the surface of the obstacle intruding into the sensing region 5 of the milliwave radar 3 inclines toward the side of the hood 4 with the time elapse, it is determined that there occurs the collision between the vehicle 1 and the pedestrian 2. Then, the pedestrian protecting unit 14 is actuated.

The pedestrian protecting unit 14 is mounted at the hood 4 of the vehicle 1, to protect the pedestrian 2 in the collision with the vehicle 1. The pedestrian protecting unit 14 can include a device (not shown) for lifting the hood 4, or/and an airbag device for deploying an airbag (not shown) on the hood 4.

Next, the collision between the vehicle 1 and a two-stage stacked object 6 such as a wooden box will be described with reference to FIGS. 3A-3C and FIG. 4. The two-stage stacked wooden box 6 has a substantially rectangular-parallelepipedal shape or the like, and includes an upper-stage member 6b and a lower-stage member 6a which is positioned at the lower side of the upper-stage member 6b.

Figure 3A:
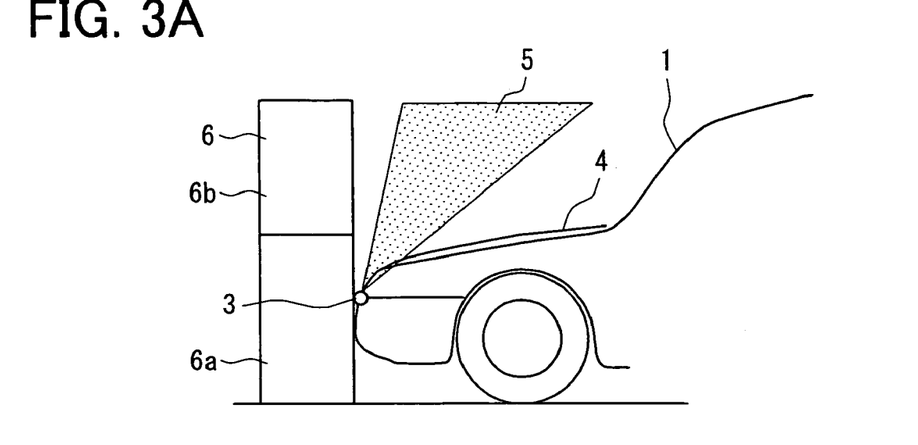
FIG. 3A is a schematic view showing a two-stage stacked wooden box and the vehicle at an instant when a collision between the vehicle and a lower-stage member of the wooden box begins according to the first embodiment.

As shown in FIG. 3A, the wooden box 6 is positioned ahead of the vehicle 1 at the instant when the collision between the vehicle 1 and the wooden box 6 begins. That is, the wooden box 6 does not exist in the sensing region 5 of the milliwave radar 3.

Figure 3B:
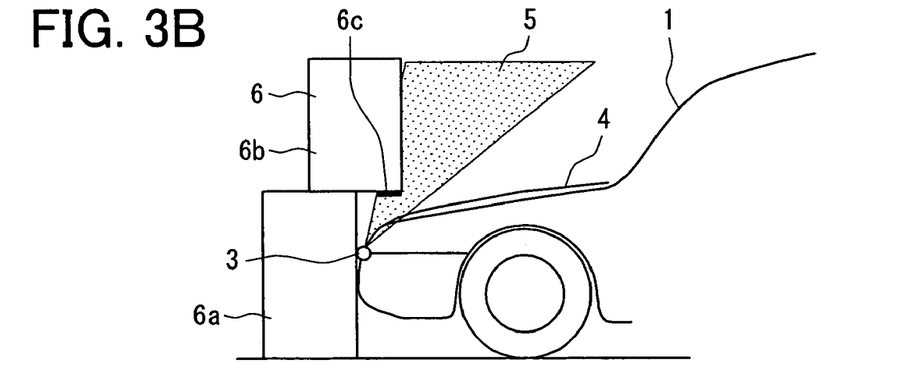
FIG. 3B is a schematic view showing the wooden box and the vehicle when the time has slightly elapsed from the state shown in FIG. 3A.

Subsequently, when the time has slightly elapsed from the state of FIG. 3A, the upper-stage member 6b of the wooden box 6 slides along the upper surface of the lower-stage member 6a thereof to move toward the side of the hood 4 of the vehicle 1 as shown in FIG. 3B. That is, the upper-stage member 6b of the wooden box 6 intrudes into the sensing region 5 of the milliwave radar 3. Specifically, the part of the vehicle-rear-side surface of the upper-stage member 6b intrudes into the sensing region 5. The bottom surface of the upper-stage member 6b of the wooden box 6 has a part which enters the sensing region 5 to be sensible by the milliwave radar 3. Referring to FIG. 3B, this part of the bottom surface of the upper-stage member 6b is substantially parallel to the ground, and indicated by the reference sign 6C.

Figure 3C:
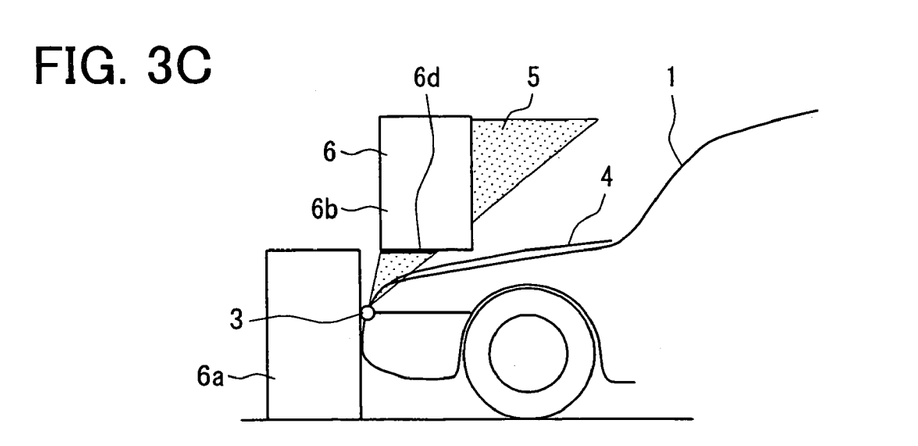
FIG. 3C is a schematic view showing the wooden box and the vehicle when the time has slightly elapsed from the state shown in FIG. 3B.

When the time has further slightly elapsed from the state of FIG. 3B, the upper-stage member 6b of the wooden box 6 slides along the upper surface of the lower-stage member 6a thereof to move further rearward at the upper side of the hood 4 of the vehicle 1, as shown in FIG. 3C. In this case, the bottom surface of the upper-stage member 6b of the wooden box 6 has a part which intrudes into the sensing region 5 of the milliwave radar 3 to be sensible by the milliwave radar 3. Referring to FIG. 3C, this part of the bottom surface of the upper-stage member 6b is substantially parallel to the ground, and indicated by the reference sign 6d.

Figure 4:
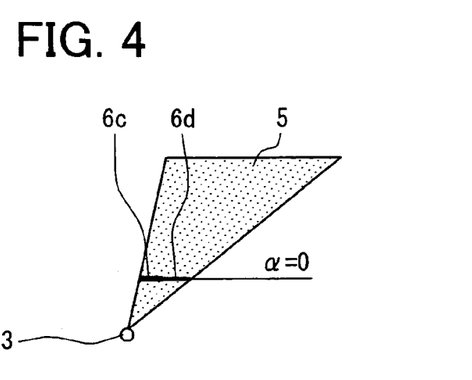
FIG. 4 is a graph showing a temporal-progress state of a surface of an upper-stage member of the wooden box in the sensing region of the milliwave radar according to the first embodiment.

FIG. 4 shows a temporal-progress state of the part (which enters sensing region 5) of the bottom surface of the upper-stage member 6b. Referring to FIG. 4, the bottom surface of the upper-stage member 6b which enters the sensing region 5 to be sensible by the milliwave radar 3, varies from the part 6c (referring to FIG. 3B) to the part 6d (referring to FIG. 3C) with the time elapsing in the collision between the vehicle 1 and the wooden box 6. In this case, with the time elapsing, the bottom surface of the upper-stage member 6b which enters the sensing region 5 moves substantially parallel with the ground toward the vehicle rear side. That is, the part of the bottom surface of the upper-stage member 6b which intrudes into the sensing region 5 to be sensible by the milliwave radar 3 has the inclination angle α which substantially keeps to be a constant, for example, zero degree.

Thus, in the case where the vehicle 1 collides with the two-stage stacked wooden box 6 or the like, the inclination angle α of the surface of the wooden box 6 which intrudes into the sensing region 5 of the milliwave radar 3 does not change with the time elapse. Therefore, the collision between the vehicle 1 and the pedestrian 2 can be distinguished from that between the vehicle 1 and the two-stage stacked object 6. Accordingly, the unnecessary actuation of the pedestrian protecting unit 14 can be restricted.

As described above, the pedestrian protecting apparatus according to the first embodiment determines that there occurs the collision between the vehicle 1 and the pedestrian 2, in the case where the inclination angle α of the surface of the obstacle which intrudes into the sensing region 5 of the milliwave radar 3 becomes small with the time elapse. That is, the surface of the obstacle which enters the sensing region 5 becomes closer to the side of the hood 4 with the time elapsing, in the case where the obstacle colliding with the vehicle 1 is the pedestrian 2.

Figure 5:
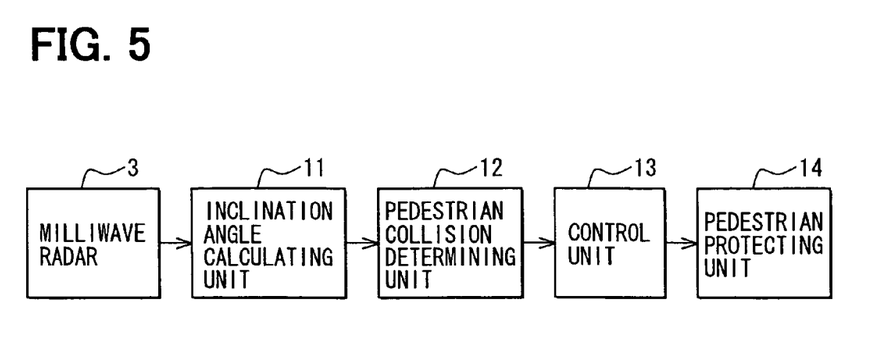
FIG. 5 is a block diagram showing a pedestrian protecting apparatus for the vehicle according to the first embodiment.

As described above, the pedestrian protecting apparatus is provided with the milliwave radar 3, the inclination angle calculating unit 11, the pedestrian collision determining unit 12, the control unit 13 and the pedestrian protecting unit 14. The milliwave radar 3 can be mounted at the upper portion of the grill positioned at the front portion of the vehicle 1. The milliwave radar 3 scans the predetermined sensing region 5 at the upper side of the hood 4 of the vehicle 1, thereby to detect the obstacle in the sensing region 5.

In this case, the inclination angle calculating unit 11 is sequentially provided with the position information items (position signals) of the surface (which enters sensing region 5) of the obstacle which are detected by the milliwave radar 3 in the collision. Thus, the inclination angle calculating unit 11 sequentially calculates the inclination angles α of the obstacle on the basis of the position information items of the surface of the obstacle. For example, the inclination angle calculating unit 11 can calculate the inclination angles α1 and α2 which respectively correspond to the states of FIGS. 1B and 1C showing the collision between the vehicle 1 and the pedestrian 2. Similarly, the inclination angle calculating unit 11 can calculate the inclination angles α of the obstacle which respectively correspond to the states of FIG. 3B and FIG. 3C, in the case where the vehicle 1 collides with the two-stage stacked wooden box 6.

The inclination angles α of the obstacle which are calculated by the inclination angle calculating unit 11 are sequentially inputted to the pedestrian collision determining unit 12. The pedestrian collision determining unit 12 determines whether or not the inclination angles α sequentially inputted thereto become gradually small. That is, the pedestrian collision determining unit 12 determines whether or not the inclination angle α inputted later has a smaller value. In the case where the inclination angles α sequentially inputted thereto become gradually small, the pedestrian collision determining unit 12 determines that the obstacle intruding into the sensing region 5 of the milliwave radar 3 is the pedestrian 2.

That is, the pedestrian collision determining unit 12 determines that the vehicle 1 collides with the pedestrian 2, in the case where it is determined that the inclination angles α sequentially inputted thereto become gradually small. On the other hand, the pedestrian collision determining unit 12 determines that the vehicle 1 collides with the obstacle other than the pedestrian 2, in the case where the inclination angles α of the obstacle sequentially inputted thereto do not become gradually small.

When the collision between the vehicle 1 and the pedestrian 2 is determined by the pedestrian collision determining unit 12, the control unit 13 performs a control so as to actuate the pedestrian protecting unit 14. Therefore, the airbag is deployed, or/and the hood 4 is raised. Thus, the pedestrian 2 can be protected from an impact on the hood 4 due to the collision.

Next, the process and operation of the pedestrian protecting apparatus will be described with reference to FIG. 6.

Figure 6:
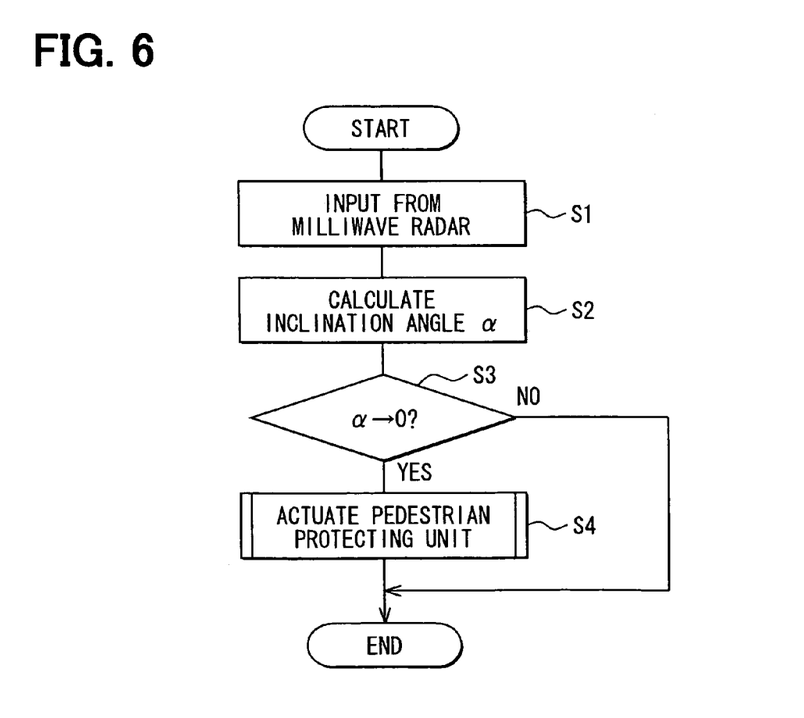
FIG. 6 is a flow chart showing a process of the pedestrian protecting apparatus for the vehicle according to the first embodiment.

Referring to FIG. 6, at first, at step S1, the position information (of obstacle intruding into sensing region 5) detected by the milliwave radar 3 is inputted to the inclination angle calculating unit 11. Subsequently, at step S2, the inclination angle calculating unit 11 calculates the inclination angle α of the obstacle on the basis of the inputted position information of the obstacle.

At step S3, the pedestrian collision determining unit 12 determines whether or not the inclination angles α of the obstacle become gradually small. In the case where it is determined that the inclination angles α of the obstacle become gradually small (i.e., "Yes" is acquired at step S3), step S4 will be performed. At step S4, the pedestrian protecting unit 14 is actuated by the control unit 13. Then, the process shown in FIG. 6 is ended.

On the other hand, in the case where it is determined that the inclination angles α of the obstacle do not become gradually small (i.e., "No" is acquired at step S3), the control unit 13 does not actuate the pedestrian protecting unit 14, and the process shown in FIG. 6 is ended.

In this embodiment, the sensing member 3 and the inclination angle calculating unit 11 construct an inclination angle detecting unit.

Next, there will be described modifications of the pedestrian protecting apparatus according to the first embodiment.

Figure 7:
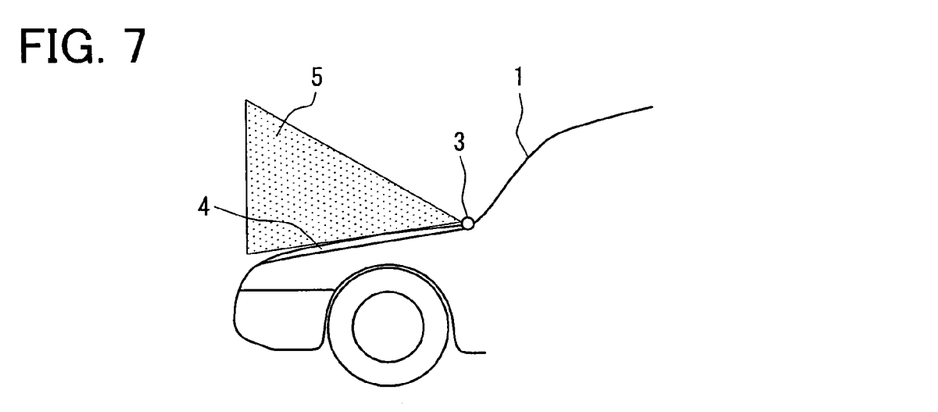
FIG. 7 is a schematic view showing an arrangement of the milliwave radar according to a first modification of the first embodiment.

As described above, the milliwave radar 3 is arranged at the upper portion of the grill of the front portion of the vehicle 1. However, the arrangement of the milliwave radar 3 is not restrictive. For example, the milliwave radar 3 can be also arranged at the side of the rear end (with respect to vehicle traveling direction) of the hood 4, as shown in FIG. 7. In this case, the milliwave radar 3 detects the surface of the obstacle in the predetermined region 5 (at upper side of hood 4) positioned at the vehicle front side of the milliwave radar 3. More alternatively, the milliwave radar 3 can be also arranged at other part of the vehicle 1, as long as the milliwave radar 3 can sense the obstacle in the predetermined sensing region 5 at the upper side of the hood 4.

The sensing member 3 can be also constructed of an infrared sensor or the like.

Alternatively, other than the milliwave radar and the infrared sensor, the sensing member 3 can be also constructed of multiple distance sensors 103 (referring to FIG. 8-FIG. 10B) to detect the obstacle in the predetermined sensing region 5 at the upper side of the hood 4.

Figure 8:
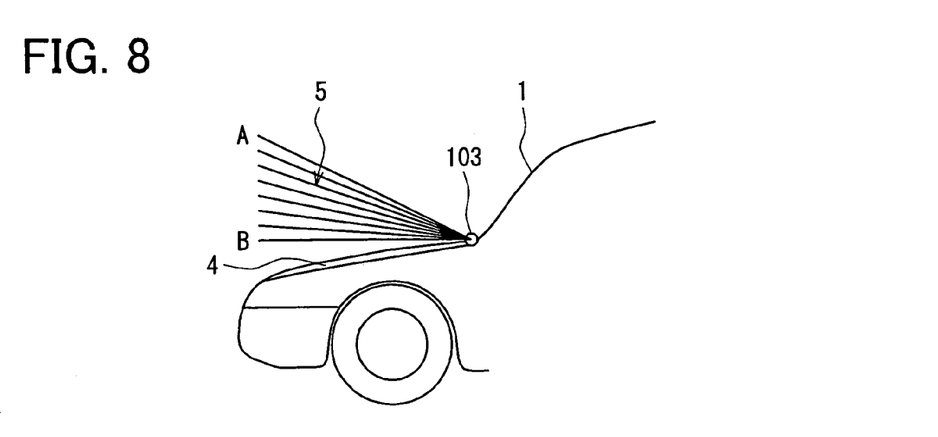
FIG. 8 is a schematic view showing an arrangement of distance sensors according to a second modification of the first embodiment.

As shown in FIG. 8, the multiple (for example, eight) distance sensors 103 are mounted at, for example, the side of the rear end (with respect to vehicle traveling direction) of the hood 4. In this case, the distance sensors 103 are mounted to respectively have detection directions which are different from each other little by little. Specifically, the first distance sensor 103 (which is indicated by "A" as shown in FIGS. 8-10B) is adapted to detect a distance in the direction remotest from the hood 4 (i.e., most inclined direction), and the eighth distance sensor 103 (which is indicated by "B" as shown in FIGS. 8-10B) is adapted to detect a distance in the direction nearest to the hood 4 (i.e., substantially in horizontal direction).

The distance sensor 103 can detect the distance from the arrangement position thereof to the surface of the obstacle in the case where the obstacle exists in the sensing region 5.

Figure 9A:
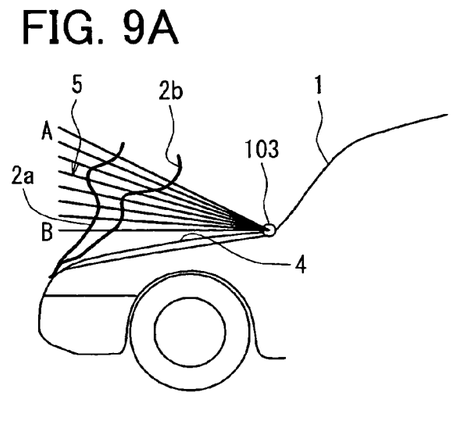
FIG. 9A is a schematic view showing a movement of the surface of the pedestrian with the time elapse in the collision according to the second modification of the first embodiment.
Figure 9B:
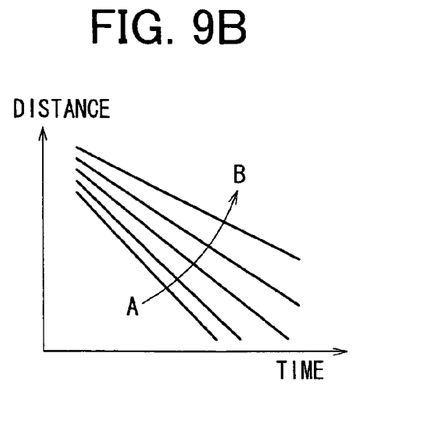
FIG. 9B is a graph showing temporal-progress variations of output values of the distance sensors in the collision between the pedestrian and the vehicle according to the second modification of the first embodiment.

As shown in FIG. 9A, in the case where the vehicle 1 collides with the pedestrian 2, the part of the surface of the pedestrian 2 which enters the sensing region 5 sequentially varies from the surface 2a to the surface 2b with the time elapsing. FIG. 9B shows temporal-progress variations of the output values of the distance sensors 103 in the collision between the vehicle 1 and the pedestrian 2. In FIG. 9B, the solid line at the lowermost side indicates the output value of the first distance sensor 103 (corresponding to "A"), and the solid line at the uppermost side indicates the output value of the eighth distance sensor 103 (corresponding to "B").

As shown in FIG. 9B, the output value of the first distance sensor 103 becomes greatly smaller than that of the eighth distance sensor 103, with the time elapsing. That is, the difference between the output values of the different distance sensors 103 increase with the time elapsing. Thus, the increase of the output value difference (between different distance sensors 103) with the time elapsing means that the obstacle intruding into the sensing region 5 gradually inclines toward the side of the hood 4 with the time elapsing. Furthermore, the increase of the output value difference (between different distance sensors 103) with the time elapsing also means that the inclination angles of the obstacle intruding into the sensing region 5 become small gradually with the time elapsing. That is, the output values of the distance sensors 103 can be used as information corresponding to the inclination angle of the obstacle in the sensing region 5.

In this case, the output values of the distance sensors 103 are inputted to the inclination angle calculating unit 11. The inclination angle calculating unit 11 outputs the information of the output values to the pedestrian collision determining unit 12. That is, the inclination angle calculating unit 11 outputs to the pedestrian collision determining unit 12 the information items (signals) which correspond to the inclination angles of the obstacle in the sensing region 5.

Subsequently, the pedestrian collision determining unit 12 determines whether or not the difference between the inputted output values of the different distance sensors 103 increases with the time elapsing. In the case where the output value difference between the distance sensors 103 increases with the time elapsing as shown in FIGS. 9A and 9B, the pedestrian collision determining unit 12 determines that the vehicle 1 collides with the pedestrian 2.

Figure 10A:
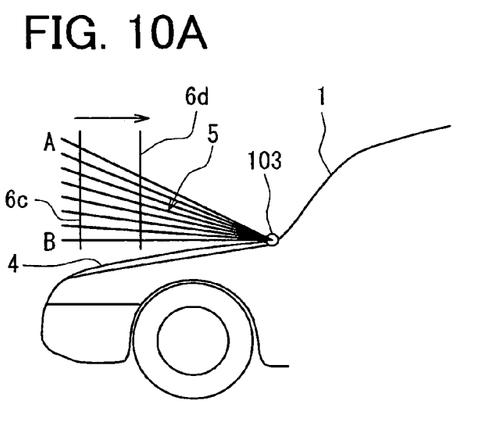
FIG. 10A is a schematic view showing a movement of the surface of the upper-stage member of the wooden box with the time elapse in the collision according to the second modification of the first embodiment.
Figure 10B:
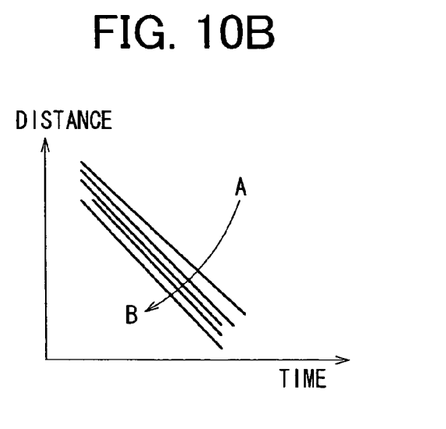
FIG. 10B is a graph showing temporal-progress variations of the output values of the distance sensors in the collision between the wooden box and the vehicle according to the second modification of the first embodiment.

On the other hand, as shown in FIG. 10A, in the case where the vehicle 1 collides with the two-stage stacked object 6 (e.g., wooden box), the surface of the upper-stage member 6b of the wooden box 6 sequentially moves from the position of the part 6c to that of the part 6d with the time elapsing. FIG. 10B shows temporal-progress variations of the output values of the distance sensors 103 in the collision between the vehicle 1 and the two-stage stacked object 6. In FIG. 10B, the solid line of the uppermost side indicates the output value of the first distance sensor 103 (corresponding to "A"), and the solid line of the lowermost side indicates the output value of the eighth distance sensor 103 (corresponding to "B").

As shown in FIG. 10B, the inclination of the line indicating the output values of each of the eight distance sensors 103 keeps substantially constant. In this case, the difference between the output values of the different distance sensors 103 hardly varies with the time elapsing. That is, the inclination angles of the obstacle intruding into the sensing region 5 of the distance sensors 103 do not vary with the time elapsing.

In this case, the output values of the distance sensors 103 are inputted to the inclination angle calculating unit 11. The inclination angle calculating unit 11 outputs the information of the output values to the pedestrian collision determining unit 12. That is, the inclination angle calculating unit 11 outputs to the pedestrian collision determining unit 12 the information items (signals) which correspond to the inclination angles of the obstacle in the sensing region 5 in the collision. Subsequently, the pedestrian collision determining unit 12 determines whether or not the difference between the inputted output values of the different distance sensors 103 increases with the time elapsing. In the case of FIGS. 10A and 10B where the difference between the output values of the different distance sensors 103 hardly varies with the time elapsing, the pedestrian collision determining unit 12 determines that the vehicle 1 collides with the obstacle other than the pedestrian 2.

Alternatively, the sensing member 3 can be also constructed of the single distance sensor 103, instead of the plurality of distance sensors. In this case, the detection direction of the distance sensor 103 is sequentially changed at the upper side of the hood 4. That is, the detection direction of the distance sensor 103 is provided with a reciprocation movement between the detection direction of the first distance sensor and that of the eighth distance sensor shown in FIG. 8. Thus, the processing similar to what is described above can be executed.

More alternatively, the sensing member 3 can be also constructed of the plurality of distance sensors 103, each of which has the sequentially-changed detection direction.

Second Embodiment

Figure 11:
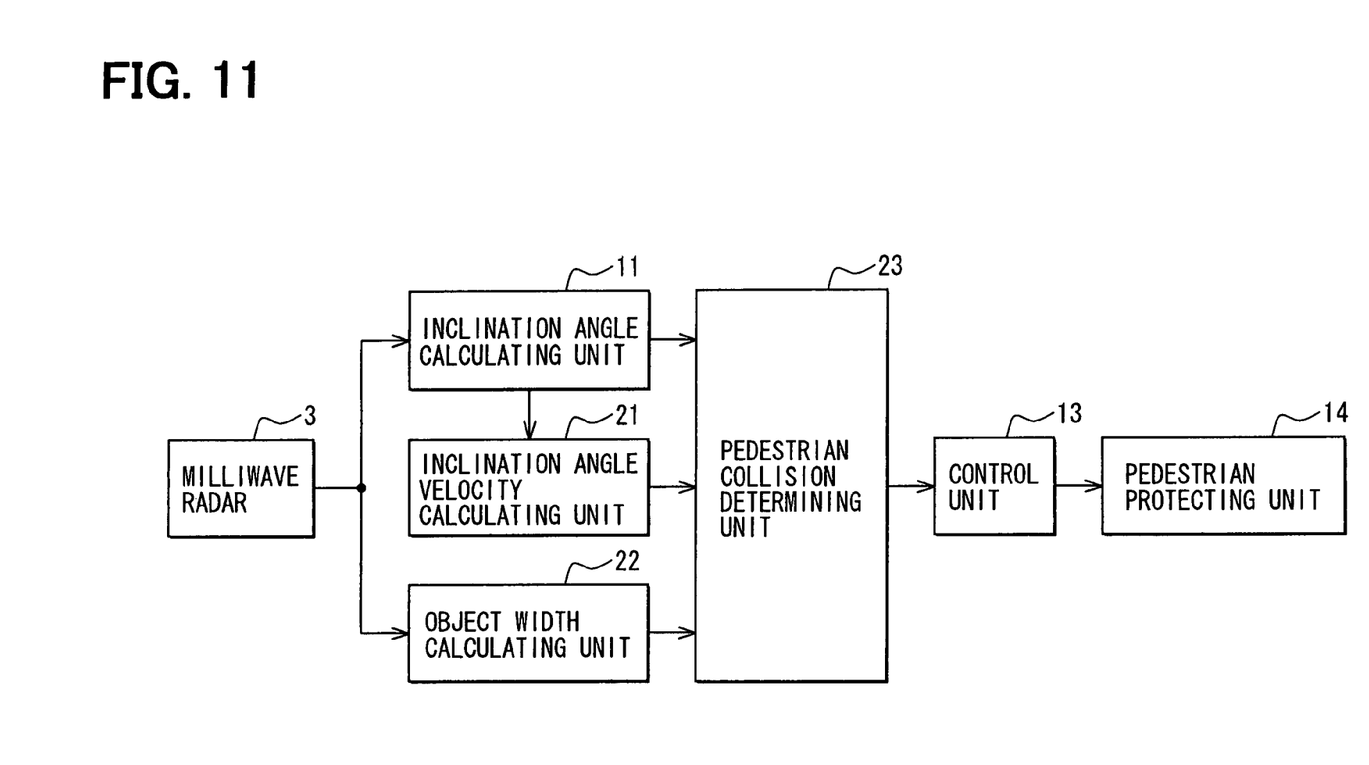
FIG. 11 is a block diagram showing a pedestrian protecting apparatus for a vehicle according to a second embodiment of the present invention.
Figure 12:
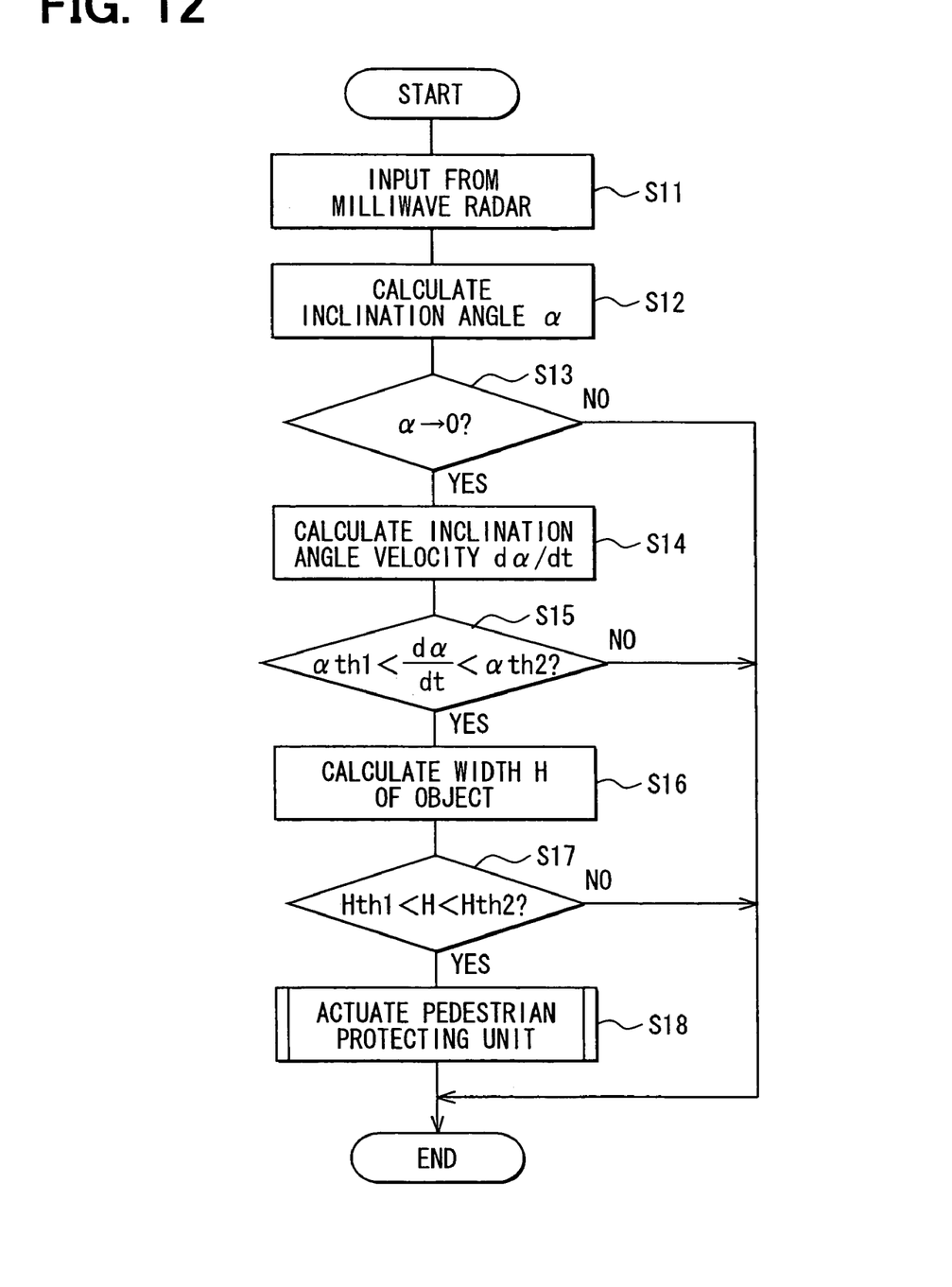
FIG. 12 is a flow chart showing a process of the pedestrian protecting apparatus according to the second embodiment.

A second embodiment of the present invention will be described with reference to FIGS. 11 and 12. As shown in FIG. 11, the pedestrian protecting apparatus in the second embodiment is provided with the milliwave radar 3, the inclination angle calculating unit 11, an inclination angle velocity calculating unit 21, an obstacle width calculating unit 22, a pedestrian collision determining unit 23, the control unit 13 and the pedestrian protecting unit 14.

In this case, the information of the inclination angle $\alpha$ of the obstacle intruding into the sensing region 5 is inputted to the inclination angle velocity calculating unit 21 from the inclination angle calculating unit 11. Thus, the inclination angle velocity calculating unit 21 calculates the inclination angle velocity $d\alpha/dt$ of the obstacle in the collision with the vehicle 1.

The position information of the obstacle detected by the milliwave radar 3 is inputted to the obstacle width calculating unit 22. The obstacle width calculating unit 22 calculates the width H of the obstacle in the left-right direction (i.e., width direction) of the vehicle according to the inputted position information of the obstacle.

The information items (signals) corresponding to the inclination angles $\alpha$ of the obstacle which are calculated by the inclination angle calculating unit 11 are sequentially inputted to the pedestrian collision determining unit 23. Then, the pedestrian collision determining unit 23 determines whether or not the inclination angles $\alpha$ (which are sequentially inputted) of the obstacle become gradually small.

Furthermore, the information (signal) corresponding to the inclination angle velocity $d\alpha/dt$ of the obstacle which is calculated by the inclination angle velocity calculating unit 21 is inputted to the pedestrian collision determining unit 23. Then, the pedestrian collision determining unit 23 determines whether or not the inputted inclination angle velocity $d\alpha/dt$ of the obstacle is within a first predetermined range memorized beforehand. In this case, the lower limit value of the first predetermined range is set as $\alpha th1$, and the upper limit value of the first predetermined range is set as $\alpha th2$.

Furthermore, the information (signal) corresponding to the width H of the obstacle in the vehicle width direction which is calculated by the obstacle width calculating unit 22 is inputted to the pedestrian collision determining unit 23. Then, the pedestrian collision determining unit 23 determines whether or not the inputted width H of the obstacle is within a second predetermined range memorized beforehand. In this case, the lower limit value of the second predetermined range is set as Hth1, and the upper limit value of the second predetermined range is set as Hth2.

Thus, the pedestrian collision determining unit 23 determines that the obstacle intruding into the sensing region 5 of the milliwave radar 3 is the pedestrian 2 in the case where the following three conditions are satisfied. The first condition is that the inclination angles $\alpha$ of the obstacle become gradually small. The second condition is that the inclination angle velocity $d\alpha/dt$ of the obstacle is within the first predetermined range. The third condition is that the width H of the obstacle in the vehicle width direction is within the second predetermined range.

On the other hand, when at least one of the three conditions is not satisfied, the pedestrian collision determining unit 23 determines that the obstacle intruding into the sensing region 5 of the milliwave radar 3 is not the pedestrian 2.

In the case where it is determined by the pedestrian collision determining unit 23 that there occurs the collision between the vehicle 1 and the pedestrian 2, the control unit 13 will actuate the pedestrian protecting unit 14 to protect the pedestrian 2.

In this case, the inclination angle calculating unit 11 and the sensing member 3 construct the inclination angle detecting unit (inclination angle variation detecting unit). The inclination angle velocity calculating unit 21 and the sensing member 3 construct an inclination angle velocity detecting unit. The obstacle width calculating unit 22 and the sensing member 3 construct an obstacle width detecting unit.

Next, the process and operation of the pedestrian protecting apparatus will be described with reference to FIG. 12.

At first, at step S11, the position information (detected by milliwave radar 3) of the obstacle entering the sensing region 5 is inputted to the inclination angle calculating unit 11. Subsequently, at step S12, the inclination angle calculating unit 11 calculates the inclination angle $\alpha$ of the obstacle on the basis of the inputted position information of the obstacle.

Then, at step S13, the pedestrian collision determining unit 23 determines whether or not the inclination angles $\alpha$ of the obstacle become gradually small (that is, whether or not the value of inclination angle $\alpha$ which is later inputted thereto is smaller). In the case where it is determined that the inclination angles $\alpha$ of the obstacle do not become gradually small (i.e., "No" is acquired at step S13), the control unit 13 does not actuate the pedestrian protecting unit 14, and the process shown in FIG. 12 is ended.

In contrast, in the case where it is determined that the inclination angles α of the obstacle become gradually small (i.e., "Yes" is acquired at step S13), step S14 will be performed. At step S14, the inclination angle velocity dα/dt of the obstacle is calculated by the inclination angle velocity calculating unit 21.

Subsequently, at step S15, the pedestrian collision determining unit 23 determines whether or not the inclination angle velocity dα/dt of the obstacle is within the first predetermined range with the lower limit value αth1 and the upper limit value αth2. That is, it is determined whether or not the inclination angle velocity dα/dt is smaller than the upper limit value αth2, and larger than the lower limit value αth1.

In the case where it is determined that the inclination angle velocity dα/dt of the obstacle is not within the first predetermined range (i.e., "N" is acquired at step S15), the control unit 13 does not actuate the pedestrian protecting unit 14 and the process is ended.

On the other hand, in the case where it is determined that the inclination angle velocity dα/dt of the obstacle is within the first predetermined range (i.e., "Yes" is acquired at step S15), the width H of the obstacle in the vehicle width direction will be calculated by the obstacle width calculating unit 22 at step S16.

Subsequently, at step S17, the pedestrian collision determining unit 23 determines whether or not the width H of the obstacle in the vehicle width direction is within the second predetermined range with the lower limit value Hth1 and the upper limit value Hth2.

In the case where it is determined that the width H of the obstacle is not within the second predetermined range (i.e., "No" is acquired at step S17), the control unit 13 does not actuate the pedestrian protecting unit 14, and the process is ended.

On the other hand, in the case where it is determined that the width H of the obstacle is within the second predetermined range (i.e., "Yes" is acquired at step S17), the pedestrian protecting unit 14 will be actuated by the control unit 13 at step S18. Then, the process shown in FIG. 12 is ended.

That is, the pedestrian protecting unit 14 is actuated in the case where the inclination angles α of the obstacle become gradually small, and the inclination angle velocity dα/dt of the obstacle is within the first predetermined range, and the width H of the obstacle in the vehicle width direction is within the second predetermined range.

In the case where the vehicle 1 collides with the pedestrian 2, the pedestrian 2 will fall toward the side of the hood 4 to gradually approach the hood 4. That is, the moving velocity (fall velocity) of the pedestrian 2 at the upper side of the hood 4 is different from that of the obstacle other than the pedestrian 2.

The fall velocity of the pedestrian 2, that is, the inclination angle velocity dα/dt of the pedestrian 2 colliding with the vehicle 1 comes to lie within a range (e.g., first predetermined range), through which the inclination angle velocity dα/dt of the obstacle (colliding with vehicle 1) other than the pedestrian 2 can be distinguished from that of the pedestrian 2.

Therefore, when the inclination angle velocity dα/dt of the obstacle in the collision is within the first predetermined range, the collision between the vehicle 1 and the pedestrian 2 can be determined. The first predetermined range can be previously set via an experiment or the like.

The width H of the pedestrian 2 in the vehicle width direction is a human-body width, to be within a range (e.g., second predetermined range). In contrast, the width H (in vehicle width direction) of a building or the like is much greater than the width of the human body. That is, the width H of the pedestrian 2 lies within the predetermined range to be distinguishable from the width H of the building or the like. Therefore, in the case where the width H of the obstacle is within the second predetermined range, the collision between the vehicle 1 and the pedestrian 2 can be determined.

According to the second embodiment, the determination of the collision with the pedestrian 2 is performed based on the inclination angle α, the inclination angle velocity dα/dt and the width H (in vehicle width direction) of the obstacle. Therefore, the collision between the vehicle 1 and the pedestrian 2 can be distinguished with a higher accuracy.

As described above, the pedestrian-vehicle collision is determined, in the case where all of the three conditions respectively related to the inclination angle α, the inclination angle velocity dα/dt and the width H of the obstacle are satisfied. That is, the inclination angle α, the inclination angle velocity dα/dt and the width H of the obstacle are measured to be used as the recognition parameters of the obstacle. However, the pedestrian-vehicle collision can be also determined in the case different from that.

For example, the pedestrian-vehicle collision can be determined in the case where the two conditions relatively related to the inclination angle α and the inclination angle velocity dα/dt of the obstacle are satisfied, or in the case where the two conditions relatively related to the inclination angle α and the width H of the obstacle are satisfied.

More alternatively, the pedestrian-vehicle collision can be also determined in the case where one of the three conditions is satisfied. That is, the collision with the pedestrian 2 is determined when the sensing member 3 has sensed the obstacle entering the sensing region 5 and the one of the three conditions respectively related to the inclination angle α, the inclination angle velocity dα/dt and the width H of the obstacle is satisfied.

However, the determination accuracy of the pedestrian-vehicle collision will be improved with the increase of the number of the conditions to be satisfied.

Third Embodiment

A third embodiment of the present invention will be described with reference to FIGS. 13-15.

Figure 13:
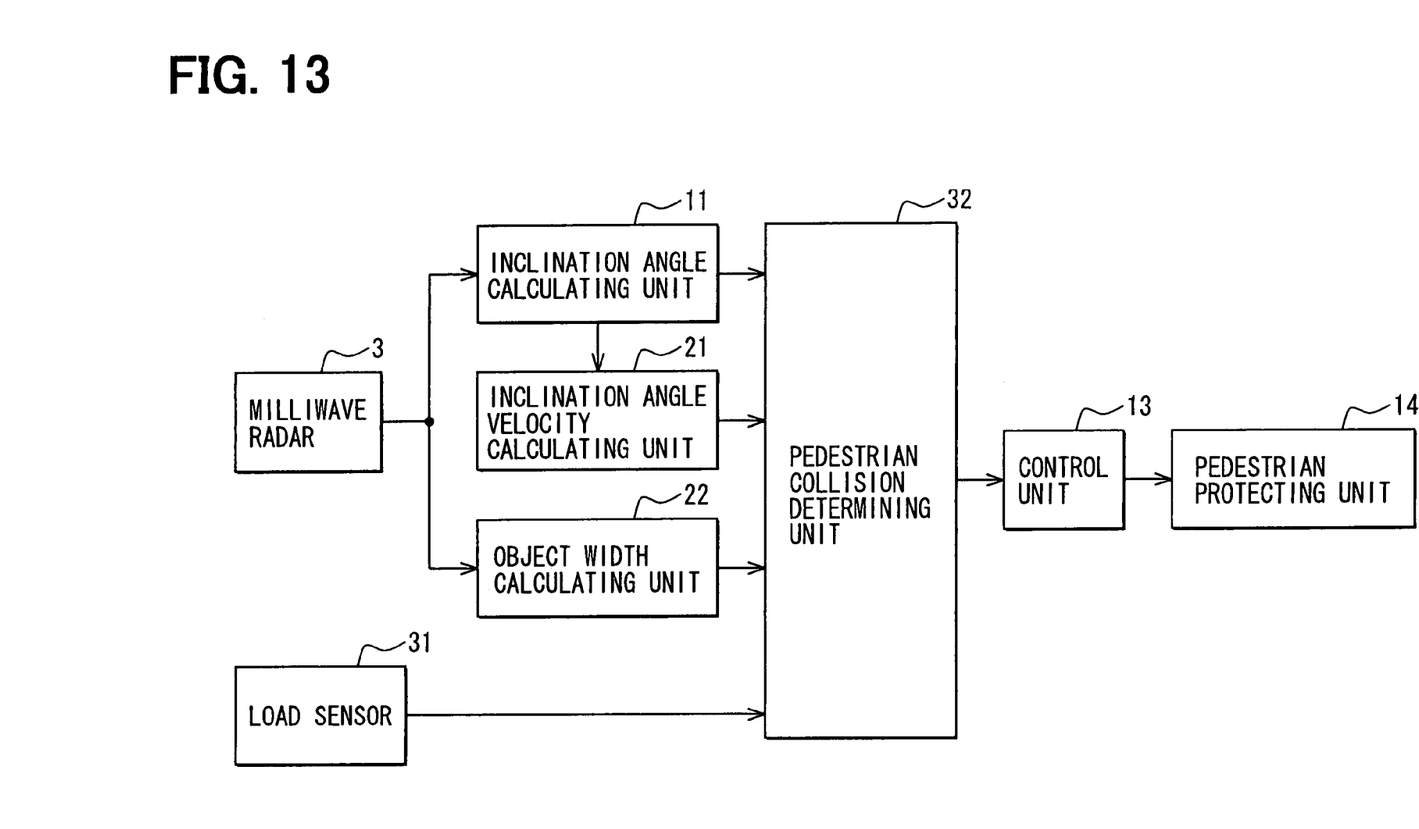
FIG. 13 is a block diagram showing a pedestrian protecting apparatus for a vehicle according to a third embodiment of the present invention.

As shown in FIG. 13, the pedestrian protecting apparatus according to the third embodiment includes the milliwave radar 3, a collision force detecting unit 31 (e.g., load sensor), the inclination angle calculating unit 11, the inclination angle velocity calculating unit 21, the obstacle width calculating unit 22, a pedestrian collision determining unit 32, the control unit 13 and the pedestrian protecting unit 14.

Figure 14:
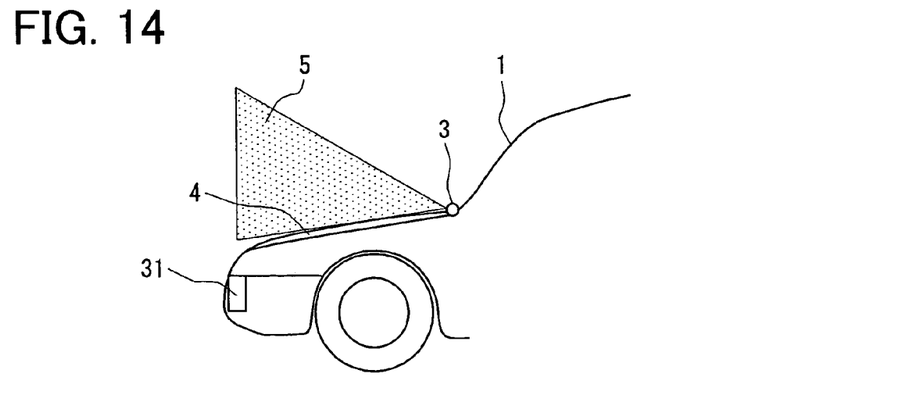
FIG. 14 is a schematic view showing an arrangement of a load sensor according to the third embodiment.
Figure 15:
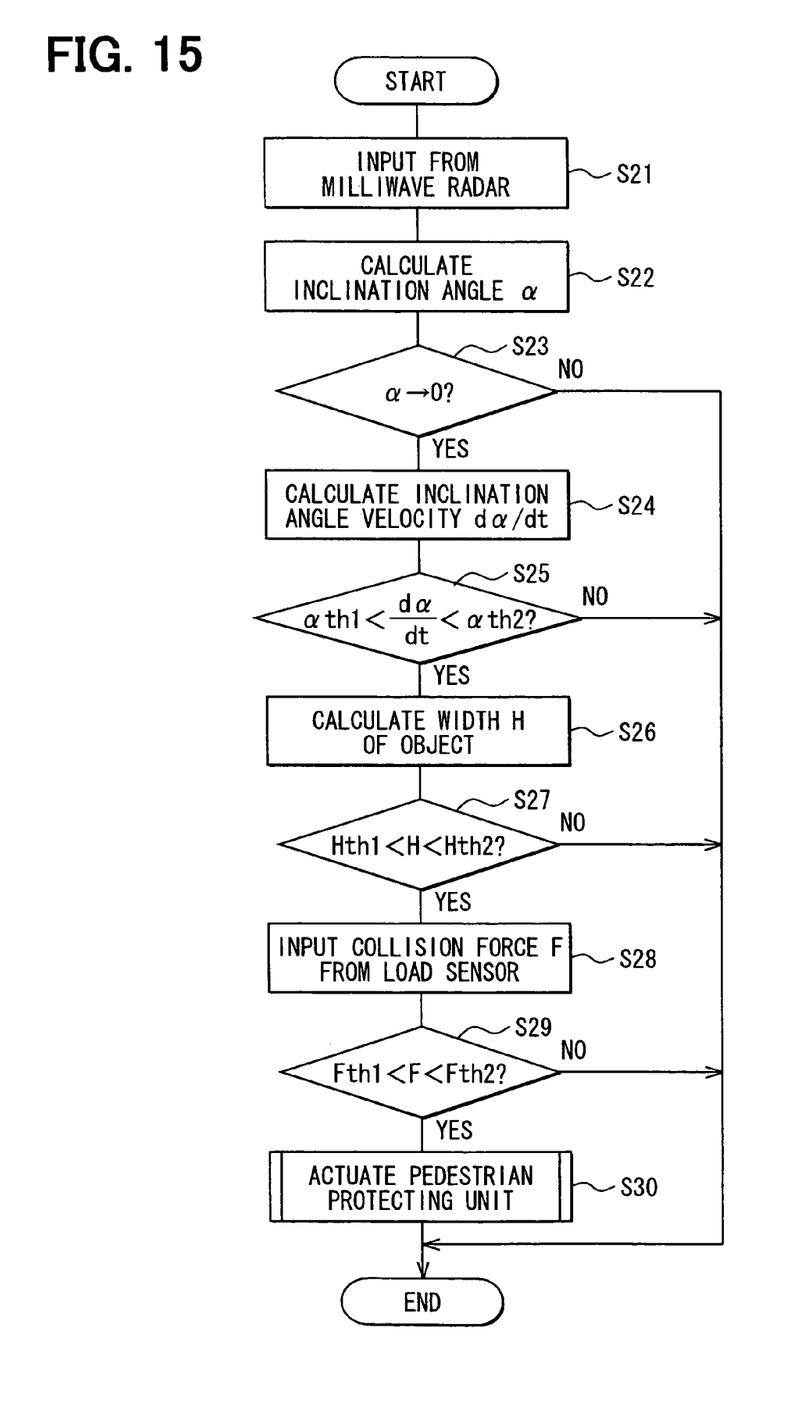
FIG. 15 is a flow chart showing a process of the pedestrian protecting apparatus according to the third embodiment.

Referring to FIG. 14, the load sensor 31 can be arranged at the front surface of a bumper of the vehicle 1, to detect a collision force F which is applied to the vehicle 1 due to the collision with the obstacle.

In this case, the signals corresponding to the inclination angles α of the obstacle which are calculated by the inclination angle calculating unit 11 are sequentially inputted to the pedestrian collision determining unit 32. Then, the pedestrian collision determining unit 32 determines whether or not the inclination angles α of the obstacle become gradually small. That is, it is determined that whether or not the value of the inclination angle α which is later inputted thereto is smaller.

Furthermore, the signal corresponding to the inclination angle velocity dα/dt of the obstacle which is calculated by the inclination angle velocity calculating unit 21 is inputted to the pedestrian collision determining unit 32. Thus, the pedestrian collision determining unit 32 determines whether or not the inclination angle velocity dα/dt of the obstacle is within the first predetermined range memorized beforehand. In this case, the lower limit value of the first predetermined range is αth1, and the upper limit value of the first predetermined range is αth2.

Moreover, the signal corresponding to the width H (in width direction of vehicle 1) of the obstacle which is calculated by the obstacle width calculating unit 22 is inputted to the pedestrian collision determining unit 32. Thus, the pedestrian collision determining unit 32 determines whether or not the width H of the obstacle is within the second predetermined range memorized beforehand. The lower limit value of the second predetermined range is Hth1, and the upper limit value of the second predetermined range is Hth2.

Furthermore, the detection value of the collision force F (applied to vehicle 1 due to collision) from the load sensor 31 is inputted to the pedestrian collision determining unit 32. Thus, the pedestrian collision determining unit 32 determines whether or not the collision force F is within a third predetermined range memorized beforehand.

In this case, the pedestrian collision determining unit 32 determines that the obstacle intruding into the sensing region 5 of the milliwave radar 3 is the pedestrian 2, in the case where the following four conditions are satisfied. The first condition is that the inclination angles α of the obstacle become gradually small. The second condition is that the inclination angle velocity dα/dt of the obstacle lies within the first predetermined range. The third condition is that the width H of the obstacle in the vehicle width direction is within the second predetermined range. The fourth condition is that the collision force F is within the third predetermined range.

On the other hand, in the case where at least one of the four conditions is not satisfied, the pedestrian collision determining unit 32 determines that the obstacle intruding into the sensing region 5 of the milliwave radar 3 is not the pedestrian 2.

When it is determined by the pedestrian collision determining unit 32 that there occurs the collision between the vehicle 1 and the pedestrian 2, the control unit 13 will actuate the pedestrian protecting unit 14 to protect the pedestrian 2.

Next, the process and operation of the pedestrian protecting apparatus according to the third embodiment will be described with reference to FIG. 15.

At first, at step S21, the position information (detected by milliwave radar 3) of the obstacle intruding into the sensing region 5 is inputted to the inclination angle calculating unit 11. Subsequently, at step S22, the inclination angle calculating unit 11 calculates the inclination angle α of the obstacle on the basis of the inputted position information of the obstacle.

Then, at step S23, the pedestrian collision determining unit 32 determines whether or not the inclination angles α of the obstacle become gradually small. In the case where it is determined that the inclination angles α of the obstacle do not become gradually small (i.e., "No" is acquired at step S23), the control unit 13 does not actuate the pedestrian protecting unit 14, and the process shown in FIG. 15 is ended.

In contrast, in the case where it is determined that the inclination angles α of the obstacle become gradually small (i.e., "Yes" is acquired at step S23), the inclination angle velocity dα/dt of the obstacle will be calculated by the inclination angle velocity calculating unit 21 at step S24.

Subsequently, at step S25, the pedestrian collision determining unit 32 determines whether or not the inclination angle velocity dα/dt of the obstacle is within the first predetermined range. That is, it is determined that whether or not the inclination angle velocity dα/dt is larger than the lower limit value αth1 and smaller than the upper limit value αth2.

In the case where it is determined that the inclination angle velocity dα/dt of the obstacle does not lie within the first predetermined range (i.e., "No" is acquired at step S25), the control unit 13 does not actuate the pedestrian protecting unit 14, and the process is ended.

On the other hand, in the case where it is determined that the inclination angle velocity dα/dt of the obstacle lies within the first predetermined range (i.e., "Yes" is acquired at step S25), the width H (in vehicle width direction) of the obstacle will be calculated by the obstacle width calculating unit 22 at step S26.

Subsequently, at step S27, the pedestrian collision determining unit 32 determines whether or not the width H of the obstacle lies within the second predetermined range from the lower limit value Hth1 and to the upper limit value Hth2.

In the case where it is determined that the width H of the obstacle does not lie within the second predetermined range (i.e., "No" is acquired at step S27), the control unit 13 does not actuate the pedestrian protecting unit 14, and the process is ended.

On the other hand, in the case where it is determined that the width H of the obstacle is within the second predetermined range (i.e., "Yes" is acquired at step S27), the value of the collision force F detected by the load sensor 31 will be inputted to the pedestrian collision determining unit 32 at step S28.

Subsequently, at step S29, the pedestrian collision determining unit 32 determines whether or not the collision force F is within the third predetermined range with the lower limit value Fth1 and the upper limit value Fth2. In the case where it is determined that the collision force F is not within the third predetermined range (i.e., "No" is acquired at step S29), the control unit 13 does not actuate the pedestrian protecting unit 14, and the process is ended.

On the other hand, in the case where it is determined that the collision force F is within the third predetermined range (i.e., "Yes" is acquired at step S29), the pedestrian protecting unit 14 will be actuated by the control unit 13 at step S30. Then, the process shown in FIG. 15 is ended.

That is, according to this embodiment, the pedestrian protecting unit 14 is actuated in the case where the inclination angles α of the obstacle become gradually small, and the inclination angle velocity dα/dt of the obstacle is within the first predetermined range, and the width H of the obstacle in the vehicle width direction is within the second predetermined range, and the collision force F is within the third predetermined range.

The collision force F applied to the vehicle 1 due to the collision between the vehicle 1 and the pedestrian 2 comes to lie within a range (e.g., third predetermined range). That is, the collision force F from the pedestrian 2 is to be within the range, through which the collision force F can be distinguished from a collision force applied to the vehicle 1 due to the collision with the obstacle other than the pedestrian 2.

Therefore, in the case where the collision force F is within the third predetermined range, the collision between the vehicle 1 and the pedestrian 2 can be determined F.

As described above, the pedestrian-vehicle collision is determined when the maximum value of the collision force F is within the certain range. Alternatively, the effective mass of the obstacle can be also used for the collision determination to improve the determination accuracy. The effective mass can be calculated by dividing the integral of the collision force F by a collision velocity of the obstacle.

According to this embodiment, it is determined that there occurs the collision between the pedestrian 2 and the vehicle 1, when all the conditions respectively related to the inclination angle α, the inclination angle velocity dα/dt, the width H and the collision force F of the obstacle are satisfied. Thus, the collision with the pedestrian 2 can be distinguished with a further high accuracy. In this case, the inclination angle α, the inclination angle velocity dα/dt, the width H and the collision force F of the obstacle are measured to be used as the reorganization parameters thereof for sort-distinguishing the obstacle.

Alternatively, the collision with the pedestrian 2 can be also determined according to the inclination angle α of the obstacle and the collision force F of the obstacle, or according to the inclination angle α of the obstacle and the inclination angle velocity dα/dt of the obstacle and the collision force F, or according to the inclination angle α of the obstacle and the width H of the obstacle and the collision force F. However, the determination accuracy of the pedestrian-vehicle collision will be improved with the increase of the number of the conditions to be satisfied.

More alternatively, the load sensor 31 can be also replaced with a touch sensor, an acceleration sensor or the like, which is capable of detecting the collision force applied to the vehicle 1 due to the collision between the vehicle 1 and the obstacle.

Other Embodiments

Although the present invention has been fully described in connection with the preferred embodiments thereof with reference to the accompanying drawings, it is to be noted that various changes and modifications will become apparent to those skilled in the art.

In the above-described embodiments, the inclination angle α, the inclination angle velocity dα/dt, and the width H of the obstacle colliding with the vehicle 1 are respectively calculated by the inclination angle calculating unit 11, the inclination angle velocity calculating unit 21 and the obstacle width calculating unit 22. However, the inclination angle α, the inclination angle velocity dα/dt, and the width H of the obstacle colliding with the vehicle 1 can be also calculated via a single calculating unit.

Moreover, a sensing member other than the sensing member 3 can be also provided for the obstacle width detecting unit so that the obstacle width calculating unit 22 calculates the width H of the obstacle according to the detection signals of the sensing member.

Such changes and modifications are to be understood as being in the scope of the present invention as defined by the appended claims.

What is claimed is:

1. A pedestrian protecting apparatus for a vehicle, comprising:
    a pedestrian protecting unit which is mounted at a hood of the vehicle to protect a pedestrian in a collision between the vehicle and the pedestrian;
    a detecting unit which senses an obstacle entering a predetermined region at an upper side of the hood and measures a recognition parameter of the obstacle;
    a pedestrian collision determining unit for determining whether or not there occurs the collision between the vehicle and the pedestrian based on the measured recognition parameter of the obstacle; and
    a control unit which actuates the pedestrian protecting unit in the case where the collision between the vehicle and the pedestrian is determined by the pedestrian collision determining unit, wherein:
    the recognition parameter of the obstacle is a variation of an inclination angle of the obstacle in the collision, the inclination angle being defined with respect to a vehicle traveling direction;
    the detecting unit is an inclination angle variation detecting unit which senses the obstacle entering the predetermined region and measures the variation of the inclination angle of the obstacle in the collision; and
    the pedestrian collision determining unit determines whether or not there occurs the collision between the vehicle and the pedestrian based on the variation of the inclination angle measured by the inclination angle variation detecting unit.

2. The pedestrian protecting apparatus according to claim 1, wherein:
    the inclination angle variation detecting unit measures the variation of the inclination angle of a surface of the obstacle; and
    the pedestrian collision determining unit determines whether or not there occurs the collision between the vehicle and the pedestrian, based on the variation of the inclination angle of the surface of the obstacle.

3. The pedestrian protecting apparatus according to claim 1, wherein
    the pedestrian collision determining unit determines that there occurs the collision between the vehicle and the pedestrian, in the case where the inclination angle of the obstacle with respect to the vehicle traveling direction becomes smaller as time elapses.

4. The pedestrian protecting apparatus according to claim 1, further comprising
    a collision force detecting unit which is arranged at a front portion of the vehicle to detect a collision force applied to the vehicle due to the collision, wherein
    the pedestrian collision determining unit determines whether or not there occurs the collision between the vehicle and the pedestrian, further considering the collision force detected by the collision force detecting unit.

5. The pedestrian protecting apparatus according to claim 1, wherein:
    the recognition parameter of the obstacle is an inclination angle velocity of the obstacle in the collision;
    the detecting unit is an inclination angle velocity detecting unit which senses the obstacle entering the predetermined region and measures the inclination angle velocity of the obstacle; and
    the pedestrian collision determining unit determines whether or not there occurs the collision between the vehicle and the pedestrian based on the inclination angle velocity detected by the inclination angle velocity detecting unit.

6. The pedestrian protecting apparatus according to claim 1, wherein:
    the detecting unit further detects an additional recognition parameter of the obstacle, which is a width of the obstacle, the width being a dimension in a vehicle left-right direction;
    the detecting unit further includes an obstacle width detecting unit which senses the obstacle entering the predetermined region and measures the width of the obstacle; and
    the pedestrian collision determining unit determines whether or not there occurs the collision between the vehicle and the pedestrian based on the width of the obstacle detected by the obstacle width detecting unit.

7. The pedestrian protecting apparatus according to claim 1, wherein:
the inclination angle variation detecting unit includes:
a sensing member for detecting inclination angle of a surface of the obstacle that enters a region above a hood of a vehicle in an inclined manner; and
an inclination angle variation calculating member for calculating the inclination angle variation of the obstacle based on the inclination angle of the surface of the obstacle, which is detected by the sensing member.

8. The pedestrian protecting apparatus according to claim 1, further comprising
the inclination angle variation detecting unit being an inclination angle velocity detecting unit for measuring an inclination angle velocity of the obstacle in the collision, wherein
the pedestrian collision determining unit uses the inclination angle velocity detected by the inclination angle velocity detecting unit as the variation of the inclination angle for determining whether or not there occurs the collision between the vehicle and the pedestrian.

9. The pedestrian protecting apparatus according to claim 8, wherein:
the inclination angle velocity detecting unit includes:
a sensing member for detecting position information of a surface of the obstacle; and,
an inclination angle velocity calculating member for calculating the inclination angle velocity of the obstacle based on the position information of the surface of the obstacle, which is detected by the sensing member.

10. The pedestrian protecting apparatus according to claim 1, further comprising
an obstacle width detecting unit for measuring a width of the obstacle, the width being a dimension in a vehicle left-right direction, wherein
the pedestrian collision determining unit determines whether or not there occurs the collision between the vehicle and the pedestrian, further considering the width of the obstacle detected by the obstacle width detecting unit.

11. The pedestrian protecting apparatus according to claim 10, wherein:
the inclination angle variation detecting unit includes a sensing member for detecting position information of a surface of the obstacle, and an inclination angle calculating member for calculating the inclination angle of the obstacle on the basis of the position information of the surface of the obstacle; and
the obstacle width detecting unit calculates the width of the obstacle based on the position information of the surface of the obstacle, which is detected by the sensing member.

12. The pedestrian protecting apparatus according to claim 1, wherein
the detecting unit includes a sensing member for detecting position information of a surface of the obstacle, and a calculating member for calculating the recognition parameter of the obstacle according to the position information of the surface of the obstacle.

13. The pedestrian protecting apparatus according to claim 12, wherein the sensing member is one of a milliwave radar and an infrared sensor.

14. The pedestrian protecting apparatus according to claim 12, wherein
the sensing member is constructed of a plurality of distance sensors which are mounted to respectively have detection directions different from each other.

15. The pedestrian protecting apparatus according to claim 12, wherein
the sensing member is a distance sensor having a detection direction which is sequentially changed.

* * * * *